United States Patent [19]

Fukuda et al.

[11] Patent Number: 4,812,032

[45] Date of Patent: Mar. 14, 1989

[54] HIGHLY-REFRACTIVE PLASTIC LENS

[75] Inventors: Tadanori Fukuda, Otsu; Sadayuki Sakamoto, Shiga; Masami Saito, Osu, all of Japan

[73] Assignee: Toray Industries, Inc., Tokyo, Japan

[21] Appl. No.: 133,476

[22] Filed: Dec. 15, 1987

Related U.S. Application Data

[62] Division of Ser. No. 20,156, Feb. 25, 1987, Pat. No. 4,721,377.

[51] Int. Cl.$^4$ ................................................. G02C 7/02
[52] U.S. Cl. ..................................... 351/159; 526/301
[58] Field of Search ............... 526/292.1, 292.3, 292.4, 526/292.5, 292.7; 351/159; 350/409, 410

[56] References Cited

U.S. PATENT DOCUMENTS 4,487,904 12/1984 Fukuda .................. 526/301

FOREIGN PATENT DOCUMENTS

| 58-14449 | 3/1983 | Japan. |
| 60-14202 | 1/1985 | Japan. |
| 60-12501 | 1/1985 | Japan. |
| 2034721 | 6/1980 | United Kingdom. |

Primary Examiner—Christopher Henderson
Attorney, Agent, or Firm—Armstrong, Nikaido, Marmelstein & Kubovcik

[57] ABSTRACT

A plastic lens formed from a copolymer of three components. A first component which is a vinyl monomer having a nucleus-halogen-substituted aromatic ring. A second component which is selected from at least one member of the group consisting of aliphatic diacrylate, dimethacrylate, triacrylate, and trimethacrylate. A third component is chosen from mono-acrylate or mono-methacrylate having a nucleus-halogen substituted aromatic ring. The components are present in the weight ratio of 20/15/0 to 85/80/60 weight percent, respectively.

4 Claims, No Drawings

HIGHLY-REFRACTIVE PLASTIC LENS

This is a division of application Ser. No. 020,156 filed Feb. 25, 1987 now U.S. Pat. No. 4,721,377.

BACKGROUND OF THE INVENTION

1. Field of the Invention

This invention relates to a plastic lens for spectacles which has high refractive index, transparency and heat resistance.

2. Description of Prior Art

A plastic lens is advantageous over a glass lens because it is light, easy to dye, and safe when it is used as a spectacle lens because of its high impact resistance.

Various resins such as an acrylic resin, a polycarbonate resin, an allyl diglycolcarbonate resin, a polystyrene resin and the like have heretofore been used for a plastic lens. Among these, diethylene glycol bisallylcarbonate, which is a thermosetting resin, is widely used for a ophthalmic lens because it has several advantages, such as high impact resistance, excellent cutting property and processability.

However, the lens of this resin is thicker at the peripheral edge portion than that of a glass lens because the refractive index of diethylene glycol bisallylcarbonate is about 1.50. This defect is more prominent as the degree of the lens is increased.

Various resins for plastic lenses free from the above-mentioned defect have recently been proposed. For example, British Pat. No. 2,034,721 teaches that a copolymer of a dimethacrylate having a bisphenol group with chlorostyrene has a refractive index of 1.591. Japanese Patent Publication No. 14449/83 teaches that a copolymer of a dimethacrylate having a tetrabromobisphenol group with chlorostyrene has a refractive index of 1.599 to 1.608. Laid-Open Japanese Patent Publication No. 12501/85 teaches that a copolymer of a tetrachloro diallylterephthalate with chlorostyrene has a refractive index of 1.600 to 1.609 and Laid-Open Japanese Patent Publication No. 14202/85 teaches a copolymer of a tetrabromo diallylphthalate with phenoxyethylacrylate has a refractive index of 1.595.

Though these resins have higher refractive index than that of crown glass (nd=1.52), they are inferior in toughness and heat resistance. Further, since the monomer mixture containing the above mentioned nucleus-halogensubstituted polyfunctional vinyl monomer used as a high refractive index component is viscous because of its high molecular weight the casting process is not easy.

For imparting a good toughness, mixing or copolymerizing these resin with polyurethane has been known. For example, U.S. Pat. No. 4,487,904 teaches that a copolymer of a nucleus-halogen substituted vinyl monomer (containing hydroxyl groups) and polyfunctional isocyanate with another vinyl monomer shows a refractive index of 1.61 to 1.63 together with good toughness.

However, the refractive index of these copolymers is still lower than that of high refractive index glass lenses (nd=1.6 to 1.8). Moreover, in ordinary cases, whenever the refractive index is increased, the Abbe number is decreased (the chromatic aberration is increased), which is disadvantageous.

OBJECT OF THE INVENTION

It is the object of the present invention to provide a plastic lens, which has a refractive index of at least 1.63, preferably at least 1.63 and especially at least 1.65 and which has excellent property in respect of chromatic aberration together with high refractive index, that is, the Abbe number is at least 40 and the refractive index is at least 1.60 and which is also excellent in toughness, transparency and heat resistance.

SUMMARY OF THE INVENTION

This invention provides a plastic lens which comprises a copolymer of a vinyl monomer having a nucleus-halogen-substituted aromatic ring (component A) with at least one member selected from the group consisting of divinylbenzene, diacrylate, dimethacrylate, triacrylate and trimethacrylate (component B).

Typical examples of component A and component B are represented by the following formulae I, II, III, IV, V, VI and I', respectively.

All of the components represented by the formulae I, I', II, III and IV are liquid at room temperature, which is advantageous in a casting operation.

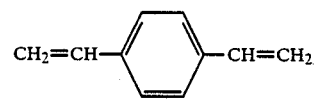

and/or

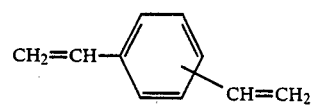

Preferred is a mixture of ⅔ meta- and ⅓ para-divinylbenzen.

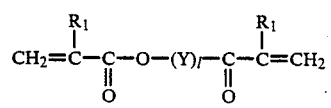

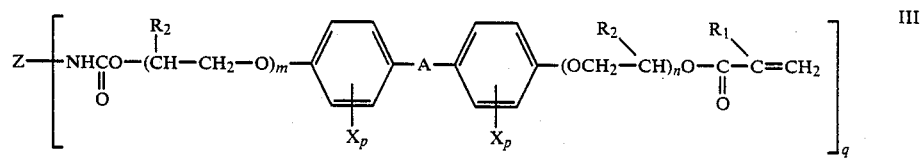

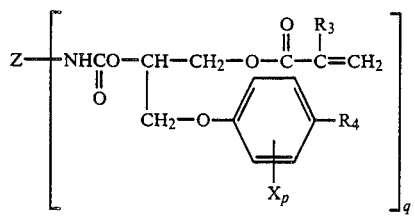

Wherein each of $R_1$, $R_2$ $R_3$ and $R_4$ are a methyl group or hydrogen, X is chlorine, bromine or iodine, Y is one being selected out of groups

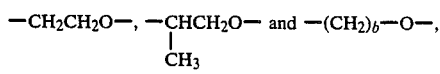

whereby b is an integer of from 3 to 10, Z is a polyfunctional isocyanate residue, A is

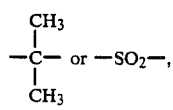

$l$ is an integer of from 1 to 10, and m and n are integers of from 0 to 4 with the proviso that the sum of m and n is an integer of from 0 to 4, p is an integer of from 1 to 4, and q is an integer of from 2 to 3.

PREFERRED EMBODIMENT OF THE INVENTION

As the above mentioned vinyl monomer having a nucleus-halogen-substituted aromatic ring (component A) compounds represented by the following formulae (V) and (VI) are preferably used in the present invention:

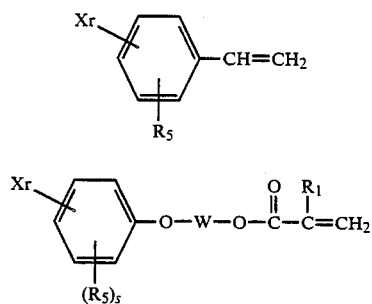

(wherein X is chlorine, bromine or iodine, $R_5$ is hydrogen or a methyl group, w is one being selected out of groups

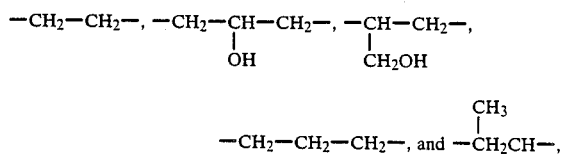

r is an integer of 1 to 5, and the sum of r and s is an integer of from 1 to 5.

Other vinyl monomers may be used in an amount of up to 60% by weight, preferably up to 50% by based on the total weight of the monomers. For the other monomers, monomers having an aromatic ring or a halogen (except fluorine) are preferable because they do not decrease the refraction index.

As specific examples of the compounds of the formula (II) among the component B, that is radical polymerizable polyfunctional monomers, there can be mentioned ethylene glycol dimethacrylate, diethylene glycol diacrylate, diethylene glycol dimethylacrylate, triethylene glycol diacrylate, triethylene glycol dimethacrylate, tetraethylene glycol diacrylate, tetraethylene glycol dimethacrylate, propylene glycol diacrylate, propylene glycol dimethacrylate, dipropylene glycol diacrylate, dipropylene glycol dimethacrylate, trimethylene glycol dimethacrylate, tetramethylene glycol dimethacrylate, pentamethylene glycol dimethacrylate, 1,6-hexane glycol diacrylate and 1,6-hexane glycol dimethacrylate.

Among the foregoing compounds, ethylene glycol dimethacrylate, diethylene glycol diacrylate, diethylene glycol dimethacrylate, triethylene glycol dimethacrylate, 1,6-hexane glycol diacrylate, 1,6-hexane glycol dimethacrylate and their mixtures are preferred.

By using the above mentioned compounds with a component A, that is a vinyl monomer having a nucleus-halogen-substituted aromatic ring, the plastic lens is obtained having the following improved characteristic.

(1) A high refractive index with a high Abbe number (the chromatic aberration is low) is attained.

(2) The properties such as toughness, heat resistance and cutting processability are improved.

By using divinyl benzene with a component B, the plastic lens is obtained having the following improved characteristic.

(1) An exceedingly high refractive index is achieved (nd 1.63).

(2) The properties such as toughness, heat resistance and cutting processability are improved.

As specific examples of the compounds of the formula (III) among the component B, that is, radical polymerizable polyfunctional monomers, there can be mentioned the compounds of the addition reaction of a monohydroxy monoacrylate or a monohydroxy monomethacrylate having a bisphenol A or bisphenol S in the molecule (hereinafter referred to as VII), with a polyfunctional isocyanate.

As specific examples of the compounds of the formula VII, there can be mentioned 2-(4-hydroxyethoxy-3,5-dibromophenyl)-2-(4-acryloxyethoxy-3,5-dibromophenyl)propane, 2-(4-hydroxyethoxy-3,5-dibromophenyl)-2-(4-methacryloxyethoxy-3,5-dibromophenyl)propane, 2-(4-hydroxyethoxy-3,5-dibromophenyl)-2-(4-acryloxy-3,5-dibromophenyl)propane, 2-(4-hydroxyethoxy-3,5-dibromophenyl)-2-(4-methacryloxy-3,5-dibromophenyl)propane, 2-(4-hydroxy-3,5-dibromophenyl)-2-(4-acryloxy-3,5-dibromophenyl)propane, 2-(4-hydroxy-3,5-dibromophenyl)-2-(4-methacryloxy-3,5-dibromophenyl)propane, 2-(4-hydroxydiethoxy-3,5-dibromophenyl)-2-(4-acryloxydiethoxy-3,5-dibromophenyl)propane and 2-(4-hydroxydiethoxy-3,5-dibromophenyl)-2-(4-methacryloxydiethoxy-3,5-dibromophenyl)propane. 4-hydroxyethoxy-3,5-dibromophenyl-4'-acryloxyethoxy-3',5'-dibromophenyl sulfone, 4-hydroxyethoxy-3,5-dibromophenyl-4'-methacryloxyethoxy-3',5'-dibromophenyl sulfone, 4-hydroxyethoxy-3,5-dibromophenyl-4'-acryloxy-3',5'-dibromophenyl sulfone, 4-hydroxyethoxy-3,5-dibromophenyl-4'-methacryloxy-3',5'-dibromophenyl sulfone, 4-hydroxy-3,5-dibromophenyl-4'-acryloxy-3',5'-dibromophenyl sulfone, 4-hydroxy-3,5-dibromophenyl-4'-methacryloxy-3',5'-dibromophenyl sulfone, 4-hydroxydiethoxy-b 3,5-dibromophenyl-4'-acryloxydiethoxy-3',5' dibromophenyl sulfone, 4-hydroxydiethoxy-3,5-dibromophenyl-4'-methacryloxydiethoxy-3',5'-dibromophenyl sulfone.

Among the foregoing compounds, 2-(4-hydroxyethoxy-3,5-dibromophenyl)-2-(4-acryloxyethoxy-3,5-dibromophenyl)propane, 2-(4-hydroxyethoxy-3,5-dibromophenyl)-2-(4-methacryloxyethoxy-3,5-dibromophenyl)propane and mixtures thereof are preferred.

The above-mentioned compounds may be used alone or in the form of a mixture of two or more of them.

As the polyfunctional isocyanate, there can be mentioned diisocyanates such as hexamethylene diisocyanate, isophorone diisocyanate, 2,2,4-trimethyl-hexamethylene diisocyanate, dicyclohexylmethane diisocyanate, lysine diisocyanate methyl ester, xylylene diisocyanate, bis(isocyanatomethyl)cyclohexane, tolylene diisocyanate and 4,4'-diphenylmethane diisocyanate, and polyfunctional isocyanates having a functionality of 3 such as a biuret reaction product of hexamethylene diisocyanate, an adduct of hexamethylene diisocyanate to trimethylolpropane, 2-isocyanatoethyl-2,6-diisocyanatohexanoate, 1,6,11-undecane triisocyanate, an adduct of isophorone diisocyanate with trimethylolpropane, an adduct of xylylene diisocyanate with trimethylolpropane and an adduct of bis(isocyanatomethyl)cyclohexane with trimethylolpropane.

Among the foregoing compounds, hexamethylene diisocyanate, xylylene diisocyanate, 2-isocyanatoethyl-2,6-diisocyanatehexanoate, 1,6,11-undecane triisocyanate are preferred.

The molar ratio between the acrylic or methacrylic monomer (VII) and the polyfunctional isocyanate is such that the NCO/OH molar ratio is in the range of from 0.5 to 2.0, preferably from 0.8 to 1.0. If the NCO/OH molar ratio is lower than 0.5, the impact strength is reduced, and furthermore, the flexural strength, heat softening property and cutting or grinding property are degraded. If the NCO/OH molar ratio exceeds 2.0, the polymer is readily discolored.

When the acrylic or methacrylic monomer (VII) is reacted with the polyfunctional isocyanate, the hydroxyl group of the acrylic or methacrylic monomer (VII) reacts with the isocyanate group of the polyfunctional isocyanate to form a urethanized acrylic or methacrylic monomer (III).

By using the urethanized acrylic or methacrylic monomer III with a component A, that is a vinyl monomer having a nucleus-halogen-substituted aromatic ring, the plastic lens is obtained having the following improved characteristic.

(1) An exceedingly high refractive index is achieved.
(2) The impact strength is improved.
(3) The properties such as toughness, heat resistance and cutting processability are improved.

The preferred halogen substituent in the compounds of formulae III, IV, V and VI is bromine.

As specific examples of the compounds of the formula IV among the component B, that is, radical polymerizable polyfunctional monomers, there can be mentioned the compounds of the addition reaction of a phenoxymonoacrylate or phenoxymonomethacrylate having a hydroxyl group in the molecule (hereinafter referred to as VIII), with polyfunctional isocyanate.

As specific examples of the compounds of the formular VIII, there can be mentioned 3-(2,4-dibromophenoxy)-2-hydroxypropyl acrylate, 3-(2,4,6-tribromophenoxy)-2-hydroxypropyl acrylate, 3-(2,4-dibromophenoxy)-2-hydroxypropyl methacrylate, 3-(2,4,6-tribromophenoxy)-2-hydroxypropyl methacrylate, 3-(2,4-iodophenoxy)-2-hydroxypropyl acrylate 3-(2,4,6-triiodophenoxy)-2-hydroxypropyl acrylate. 3-(2,4,6-tribromo-3-methylphenoxy)-2-hydroxypropyl acrylate, 3-(2,4-dibromo-3-methylphenoxy)-2-hydroxypropyl acrylate, 3-(2,6-diiodo-3-methylphenoxy)-2-hydroxypropyl acrylate, 3-(2,4,6-tribromo-3-methylphenoxy)-2-hydroxypropyl methacrylate, 3-(3-methyl-5-bromophenoxy)-2-hydroxypropyl acrylate and 3-(3-methyl-5-iodophenoxy)-2-hydroxypropyl methacrylate. Among the foregoing compounds, 3-(2,4,6-tribromophenyoxy)-2-hydroxypropyl acrylate, 3-(2,4-dibromophenoxy)-2-hydroxypropyl acrylate and 3-(2,4-iodophenoxy)-2-hydroxypropyl acrylate compounds, 3-(2,4,6-tribromo-3-methylphenoxy)-2-hydroxypropyl acrylate, 3-(2,4-dibromo-3-methylphenoxy)-2-hydroxypropyl acrylate, 3-(3-methyl-5-bromophenoxy)-2-hydroxypropyl acrylate and mixtures thereof are preferred. The above-mentioned compounds may be used alone or in the form of a mixture of two or more of them.

The species of the polyfunctional isocyanates and the molar ratio between the acrylic or methacrylic monomer VIII and the polyfunctional isocyanates may be used as same as the case of the acrylic or methacrylic monomer VII.

By using the urethanized acrylic or methacrylic monomer IV with a component A, that is a vinyl monomer having a nucleus-halogen-substituted aromatic ring, the plastic lens is obtained having the following improved characteristic.

(1) An exceedingly high refractive index is achieved.
(2) The impact strength is improved.
(3) The properties such as toughness, heat resistance and cutting processability are improved.

As specific examples of the compounds of the formula V among the component A, that is, vinyl monomers having a nucleus-halogen-substituted aromatic ring, there can be mentioned dibromostyrene, bromostyrene, dichlorostyrene, chlorostyrene, diiodostyrene, iodostyrene, methylbromostyrene methylchlorostyrene and so forth, and their mixtures.

Particularly preferable thereamong are bromostyrenes especially dibromostyrene.

As specific examples of the compounds of the formula VI among the component A, that is, vinyl monomers having a nucleus-halogen-substituted aromatic ring, there can be mentioned 3-(2,3,4,5,6-pentabromophenoxy)-2-hydroxypropyl acrylate, 2,3,4,5,6-pentabromophenoxyethyl acrylate, 2,3,4,5,6-pentabromophenoxyethyl methacrylate, 3-(2,4,6-tribromophenoxy)-2-hydroxypropyl acrylate, 3-(2,4,6-tribromophenoxy)-2-hydroxypropyl methacrylate, 2,4,6-tribromophenoxypropyl acrylate, 2,4,6-tribromophenoxypropyl methacrylate, 3-(2,4,6-tribromo-3-methylphenoxy)-2-hydroxypropyl acrylate, 2-(2,4,6-tribromo-3-methylphenoxy)-1-hydroxymethylethyl acrylate, 2,4-dibromophenoxyethyl acrylate, 3-(2,4-dibromophenoxy)-2-hydroxypropyl acrylate, 3-(2,4-dibromo-3-methylphenoxy)-2-hydroxypropyl acrylate, 3-(2,3,4,5,6-pentachlorophenoxy)-2-hydroxypropyl acrylate, 2,4,6-trichlorophenoxyethyl methacrylate, 2,4,6-tribromophenoxyethyl acrylate, 2,4,6-tribromophenoxyethyl methacrylate, and so forth.

Particularly preferable among the above compounds are 3-(2,3,4,5,6-pentabromophenoxy)-2-hydroxypropyl acrylate, 2,4,6-triblomophenoxyethyl methacrylate, 2,4,6-tribromophenoxyethyl acrylate, 2,3,4,5,6-pentabromophenoxyethyl acrylate, 2,3,4,5,6-pentabromophenoxyethyl methacrylate and their mixtures.

The copolymerization ratio of the vinyl monomer having a nucleus-halogen-substituted aromatic ring (A) to the radical-polymerizable polyfunctional monomer (B) should be at 10 to 90, preferably 20–85, percent by weight based on the sum of the monomers (A) and (B). If the copolymerization ratio of the vinyl monomer (A) exceeds 90 percent by weight, not only the cutting or grinding property but also the impact strength, and the heat resistance are degraded because of the shortage of crosslinkage among the monomers. While if the copolymerization ratio of the vinyl monomer (A) is below 10 percent by weight, the intended improvement of the high refractive index cannot be attained.

In order to improve or control other properties for ophthalmic lens, the above mentioned monomers A and B are copolymerized with an other vinyl monomer (s) having an aromatic ring and/or halogen (except fluorine) in the molecule. This other vinyl monomer having an aromatic ring and/or halogen (except fluorine) in the molecule may be used in an amount of up to 70 percent, preferably up to 60 percent by weight based on the total weight of the monomers.

As specific examples of the other vinyl monomer having an aromatic ring and/or halogen (except fluorine), there can be mentioned styrene, phenyl acrylate, phenyl methacrylate, monochlorophenyl acrylate, monochlorophenyl methacrylate, dichlorophenyl acrylate, dichlorophenyl methacrylate, trichlorophenyl acrylate, trichlorophenyl methacrylate, monobromophenyl acrylate, monobromophenyl methacrylate, dibromophenyl acrylate, dibromopnenyl methacrylate, tribromophenyl acrylate, tribromophenyl methacrylate, pentabromophenyl acrylate, pentabromophenyl methacrylate, 2,2-bis(4-methacryloxyethoxy-3,5-dibromophenyl)propane, 2,2-bis(4-acryloxyethoxy-3,5-dibromophenyl)propane, diallyl phthalate, diallyl isophthalate, N-vinylcarbazole, benzyl acrylate, brombenzyl acrylate, dibromobenzyl acrylate, vinylnaphthalene, naphthy methacrylate, trially, trimetllitate, 2,3-dibromopropyl acrylate, tribromophentyl acrylate, tribromopentyl methacrylate, 2,2-bis(4-methacryloxy-3,5-dibromophenyl)sulfone, 2,2-bis(4-acryloxy-3,5-dibromophenyl)sulfone, 2,2-bis(4-methacryloxyethoxy-3,5-dibromophenyl)sulfone, 2,2-bis(4-acryloxyethoxy-3,5-dibromophenyl)sulfone and their mixtures.

Among the foregoing compounds, tribromopentyl acrylate, tribromopentyl methacrylate, tribromophenyl methacrylate, 2,2-bis(4-methacryloxyethoxy-3,5-dibromophenyl)propane, 2,2-bis(4-acryloxyethoxy-3,5-dibromophenyl)propane, 2,2-bis(4-methacryloxyehoxy-3,5-dibromophenyl)sulfone, 2,2-bis(4-acryloxyethoxy-3,5-dibromophenyl)sulfone and their mixtures.

If the other vinyl monomer above-mentioned exceeds 70 percent by weight, the toughness the impact strength, the heat resistance and the cutting or grinding property are decresased.

The plastic lens according to the subject invention are extensively applicable as spectacle, convex or concave, for optical apparatuses, and so forth. Particularly its thickness and weight can be decreased because of its high refractive index. It is especially useful as the concave lens of the spectacles for the short-sighted in which thick portion at the peripheral edge portion spoils the appearance.

In this invention, a cast polymerization is adopted. In which the starting monomers are directly polymerized and cured and simultaneously molded into the form of a lens.

Most of commercially available dioptral lenses are now prepared by this method because the molding distortion is reduced and the obtained lens is excellent in optical uniformity.

The monomers (A), (B) and/or other vinyl monomers are mixed together, and a polymerization initiator is added to the mixture to preliminarily polymerize to some extent (pre-polymerization). After dissolved gases such as air are removed in vacuo, the pre-polymerization product is cast in a mold, where polymerization is carried out under heating.

In order to reduce the distortion in the resulting lens, it is preferred that in the initial stage, the polymerization reaction be carried out at a relatively low temperature, for example, 40° to 50° C. and the temperature be elevated to about 110° C. to 130° C. to gradually effect polymerization.

Any of known polymerization initiators can be used, but an appropriate polymerization initiator should be selected depending upon the intended reaction temperature. For example, there are preferably used diisopropylperoxy dicarbonate, t-butylperoxyethyl hexanoate, t-butylperoxy isobutylate, t-butylperoxyisopropyl carbonate, di-t-butyl peroxide, 1,1-azobiscyclohexane carbonate, 1,1'-azobiscyclohexane nitrate, azobisisobutylonitrile and so forth.

Depending on polymerization conditions and the kind of the monomers of copolymerization components, the kind and ratio of the radical polymerization initiators cannot be limited. However, the latter should preferably be 0.001 to 5 percent by weight to the total quantity of monomers.

An appropriate additive selected from a surface lubricant, an ultraviolet absorber, an antioxidant, a discoloration-preventing agent, an antistatic agent, a fluorescent dye and a stabilizer may be used at the polymerization step according to need.

The plastic lens of this present invention has the following improved characteristics as compared with commercially available plastic lenses.

(1) An exceedingly high refractive index is achieved.
(2) The properties such as toughness, transparence, heat resistance and cutting or grinding processability are improved.
(3) The monomers (A), (B) and/or other vinyl monomers can appropriately be chosen, whereby the optical characteristics can be freely adjusted.

The plastic lens of this present invention may be subjected to a known physical of chemical surface treatment for imparting the reflection-preventing property, high hardness, abrasion resistance, chemical resistance and anti-fogging property. For example, there is preferably adopted a method in which two coatings of different refractive indexes are formed to attain a reflection-preventing effect, a method in which a coating layer having a high hardness is formed on the surface by coating with a polysiloxane or silica sol, a method in which a surface coating is dyed to improve the fashion characteristic, a method in which a metal film is formed on the surface by a vacuum deposition or the like to impart a mirror effect, a method in which a moisture-adsorbing coating is formed on the surface to prevent fogging.

Further the structure and components of the lens of this invention can be analyzed by means of IR, NMR, elementary analysis and so forth.

This invention is described in detail with reference to the following examples and comparative examples. From the results of these examples and comparative examples, it would be easily understood that the plastic lens of this invention is superior both in optical characteristics and the other properties as ophthalmic lens. Of course, these examples by no means limit the scope of the invention.

In the examples and comparative examples, the physical properties were determined according to the following methods.

Refractive Index and Abbe Number:

The measurement was carried out at 20° C. by using an Abbe refractometer.

$n_d$ was measured at d-line of He (587.6 nm) and $\nu_d$ was calculated by following equation.

$$\nu_d = \frac{nd - 1}{n_F - n_c}$$

$n_F$; Refractive index at F-line of H (486.1 nm)
$n_c$; Refractive index at c-line of H (656.3 nm)

Color:

The color of a plate or molded lens was observed with the naked eye.

Edging processability:

After the grinding a peripheral edge portion of a lens by using an automatic lens edger (Takubo Machine Works Co., Ltd.), the lens having no cracking, having smooth cutting surface and having produced powdery cutting chips were accepted. (This edger is usually used for CR-39 or glass lens).

Vicat Softening test:

VICAT penetration distance at 100° C. was given in the test according to JIS K-7206 because no testpiece reached the maximum penetration of 1 mm.

Rigidity:

Flexural modulas and deflection was determined according to the method of ASTM D747. Test pieces had a size of 30 mm × 10 mm × 3 mm.

Flexural deflection means the maximum deflection of the center of the test piece.

EXAMPLE 1

An amount of 85 parts by weight of dibromostyrene and 15 parts by weight of divinylbenzene (made by Sankyo Kasei Kogyo Co., which purity is 60 percent) were mixed and 0.1 part by weight of diisopropylperoxy dicarbonate and 0.1 part by weight of di-tert-butyl peroxide were added as radical-polymerization initiators. The mixture was a colorless transparent liquid having a low viscosity.

The liquid mixture was cast in a mold constructed by a glass mold and a polyethylene gasket. The cast polymerization was started from 40° C. and the temperature was raised stepwise up to 120° C. Thus the polymerization was conducted over a period of 30 hours.

The polymer obtained was colorless and transparent, and showed an exceedingly high refractive index $n_D$ of 1.66 among plastic lenses and an Abbe number of 30.

The other physical properties of the polymer are shown in Table 1.

EXAMPLE 2

An amount of 85 parts by weight of 2,3,4,5,6-pentabromophenoxyethyl acrylate and 15 parts by weight of divinylbenzene (made by Sankyo Kasei Kogyo Co., 60 percent purity) were mixed and 0.1 part by weight of di-tertbutyl peroxide was added. The mixture was sufficiently stirred. This mixture was a colorless, transparent and slightly viscous liquid.

Then the liquid mixture was subjected to vacuum degassing, and was cast in a mold constructed from a glass mold having a diameter of 75 mm and a polyethylene gasket. The cast polymerization was continued for 40 hours with its temperature gradually raised from 60° C. to 130° C. in stepwise.

The molding obtained was colorless and transparent and showed a refractive index $n_d$ of 1.65 and an Abbe number of 28.

The other physical properties of the polymer are shown in Table 1.

EXAMPLE 3

Lens was made in the same manner as described in Example 2 but using 80 parts by weight of 3-(2,3,4,5,6-pentabromophenoxy)-2-hydroxypropyl methacrylate in stead of 85 parts by weight of 2,3,4,5,6-pentabromophenoxyethyl acrylate, and using 20 parts by weight of divinylbenzene (made by Dow Chemical Co., 80 percent purity) in stead of 15 parts by weight of divinylbenzene (made by Sankyo Kasei Kogyo Co., 60 percent purity). The polymer obtained was colorless and transparent, and showed a refractive index $n_D$ of 1.65 and an Abbe number of 29. The other physical properties of the polymer are shown in Table 1.

EXAMPLE 4

To a mixture of 40 parts by weight of dibromostyrene, 40 parts by weight of 2,3,4,5,6-pentabromophenoxyethyl acrylate and 20 parts by weight of divinylbenzene (made by Dow Chemical Co., 80 percent purity) was added 0.1 part by weight of di-tert-butyl peroxide, and the mixture was sufficiently stirred. The mixture was a colorless, transparent and low viscous liquid. The cast polymerization was carried out in the same manner as described in Example 2.

The polymer obtained was colorless and transparent, and showed a refractive index $n_D$ of 1.65 and an Abbe number of 30.

The other physical properties of the polymer are shown in Table 1.

EXAMPLE 5

0.01 part by weight of dibutyltin dilaurate as an NCO-OH reaction catalyst and 0.1 part by weight of di-tert-butyl peroxide as a polymerization initiator were added to 3.6 parts by weight of xylylene diisocyanate, 26.4 parts by weight of 2-(4-acryloxyethoxy-3,5-dibromophenyl)-2-(4-hydroxyethoxy-3,5-dibromophenyl)propane and 70 parts by weight of dibromostyrene and the mixture was sufficiently stirred. The obtained liquid mixture had a low viscosity and could easily be cast in a lens mold. The cast polymerization was carried out in the following manner using a glass mold and a polyethylene gasket.

Namely, the mixture was heated at 60° C. for 5 hours to complete the NCO/OH reaction, and subsequently, the resulting liquid mixture was heated at 80° C. for 5 hours, at 90° C. for 5 hours, at 100° C. for 9 hours, at 110° C. for 9 hours and at 120° C. for 5 hours to effect curing reaction.

After completion of the polymerization, the mold was gradually cooled and the polymer was parted from the mold.

The polymer obtained was colorless, transparent, and tough, and showed a refractive index $n_D$ of 1.65 and an Abbe number of 31.

The other physical properties of the polymer are shown in Table 1.

EXAMPLE 6

An amount of 2.4 parts by weight of xylylene diisocyanate, 17.6 parts by weight of 2-(4-acryloxyethoxy-3,5-dibromophenyl)-2-(4-hydroxyethoxy-3,5-dibromophenyl)propane, 70 parts by weight of dibromostyrene and 10 parts by weight of divinylbenzene (made by Dow Chemical Co., 80 percent purity) were mixed and 0.01 part by weight of dibutyltin dilaurate as an NCO-OH reaction catalyst and 0.1 part by weight of tert-butyl peroxy isopropyl carbonate were added and the mixture was sufficiently stirred. The NCO-OH reaction and the polymerization reaction in a glass mold and a polyethylene gasket were carried out in the same manner as described in Example 5. The polymer obtained was colorless, transparent and tough, and showed a refractive index $n_D$ of 1.65 and an Abbe number of 31.

The physical properties of the polymer are shown in Table 1.

EXAMPLE 7

A mixture comprising 1.1 parts by weight of hexamethylene diisocyanate, 8.9 parts by weight of 2-(4-acryloxyethoxy-3,5-dibromophenyl)-2-(4-hydroxyethoxy-3.5-dibromophenyl)propane, 45 parts by weight of dibromostyrene, 18 parts by weight of 2,3,4,5,6-pentabromophenoxyethyl methacrylate, 27 parts by weight of 2,2-bis(4-acryloxyethoxy-3,5-dibromophenyl)sulfone and 0.01 part by weight of dibutyltin dilaurate was stirred and heated at 50° C. for 2 hours to conduct the reaction. The reaction mixture was cooled to room temperature and 0.1 part by weight of tert-butyl peroxy isopropyl carbonate as a polymerization initiator was added. The resulting mixture was a slightly viscous liquid and could easily be cast in a lens mold. The polymerization reaction was carried out in the same manner as described in Example 5. The obtained resin was tough, colorless and transparent and was excellent in uniformity. The refractive index $n_D$ as measured at 20° C. was as high as 1.65 and the Abbe number was 31.

Other physical properties of the polymer are shown in Table 1.

EXAMPLE 8

An amount of 60 parts by weight of dibromostyrene, 10 parts by weight of 2,3,4,5,6-pentabromophenoxyethyl acrylate and 30 parts by weight of 1,6-hexane dimethacrylate were mixed and 0.01 part by weight of tert-butyl peroxy isobutylate and 0.04 part by weight of tert-butyl peroxy isopropyl carbonate were added. The mixture was sufficiently stirred. The obtained mixture was a colorless transparent liquid having a low viscosity. After being subjected to the vacuum degassing, this liquid mixture was cast in a lens mold. The polymerization was started at 60° C. and the temperature was elevated stepwise from 60° C. to 110° C. for 40 hours. The obtained polymer was tough, colorless and transparent, and the refractive index $n_D$ was as high as 1.60 and the Abbe number was 40 which showed excellent in a chromatic aberration.

Other physical properties of the polymer are shown in Table 1.

EXAMPLE 9

An amount of 45 parts by weight of dibromostyrene, 20 parts by weight of 2,3,4,5,6-pentabromophenoxyethyl acrylate and 35 parts by weight of ethylene glycol dimethacrylate were mixed and 0.01 part by weight of tert-butyl peroxy isobutylate and 0.04 part by weight of tert-butyl peroxy isopropyl carbonate were added. The mixture was sufficiently stirred. The obtained mixture was a colorless transparent liquid having a low viscosity. The cast polymerization was carried out in the same manner as described in Example 8.

The molding obtained was colorless, transparent and rigid, and showed a high refractive index $n_D$ of 1.60 and an Abbe number of 40, which showed excellent in a chromatic aberration.

The other physical properties of the molding are shown in Table 1.

EXAMPLE 10

Lens was made in the same manner as described in Example 8 but using 40 parts by weight of dibromostyrene, 20 parts by weight of divinylbenzene (made by Dow Chemical Co., 80 percent purity) and 40 parts by weight of tribromopentyl acrylate in stead of monomers and their quantities used in Example 8. The polymer obtained was colorless and transparent, and showed a refractive index $n_D$ of 1.60 and an Abbe number of 40, which was excellent in a chromatic aberration.

Other physical properties of the polymer are shown in Table 1.

Comparative Example 1

An amount of 40 parts by weight of styrene and, 2,2-bis(4-methacryloxyethoxy-3,5-dibromophenyl)propane were mixed, and 0.1 part by weight of di-tert-butyl peroxide and 0.1 part by weight of diisopropylperoxy dicarbonate were added as radical-polymerization initiators. The polymerization was carried out in the same manner as described in Example 1.

The polymer obtained was colorless and transparent, but was not good in toughness and heat resistance. The refractive index $n_D$ was 1.59 and the Abbe number was 32.

Comparative Example 2

0.01 part by weight of dibutyltin dilaurate as an NCO-OH reaction catalyst and 0.1 part by weight of di-tert-butyl peroxide as a polymerization initiator were added to 40 parts by weight of styrene, 6 parts by weight of hexamethylene diisocyanate and 54 parts by weight of 2-(4-acryloxyethoxy-3,5-dibromophenyl)-2-(hydroxyethoxy-3,5-dibromophenyl)propane and the mixture was sufficiently stirred.

The polymerization was carried out in the same manner as described in Example 5.

The polymer obtained was colorless and transparent, but not sufficient in heat resistance. The refractive index $n_D$ was 1.60 and the Abbe number was 32.

Other physical properties of the polymer are shown in Table 1.

Comparative Example 3

An amount of 70 parts by weight of 2,3-dibromopropyl methacrylate; and 30 parts by weight of 2,2-bis(4-methacryloxyethoxy-3,5-dibromophenyl)sulfone were mixed, and 0.1 part by weight of di-tert-butyl peroxide were added.

The polymerization was carried out in the same manner as described in Examples 1. The polymer obtained was colorless and transparent, but was not sufficient in heat resistance and toughness either.

The refractive index $n_D$ was 1.59 and the Abbe number was 38.

Other physical properties of the polymer are shown in Table 1.

ST: styrene
DBPMA: 2,3-dibromopropyl methacrylate
BMEBr2PP: 2,2-bis(4-methacryloxyethoxy-3,5-dibromophenyl)propane

We claim:

1. A plastic lens which comprise a copolymer of (A) 20 to 85 percent by weight of dibromostyrene with (B) 15 to 80 percent by weight of divinylbenzene and (C) less then 60 percent by weight of mono-acrylate, or mono-methacrylate having a nucleous-halogen substituted aromatic ring, said copolymer being in the form of a lens.

2. A plastic lens according to claim 1, wherein component C is a monomer represented by the following general formulae I.

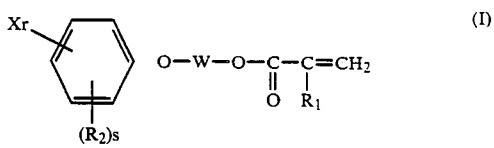

wherein X is chlorine, bromine, or iodine, $R_1$ and $R_2$ is

TABLE 1

| No. | Monomer Composition (wt %) | Refractive index $n_d$ | Abbe number $\nu_D$ | Color | VICAT penetration (mm/100° C.) | Flexural Modulas (kg/mm) | Flexural Deflection (mm) | Cutting and Crinding Properties |
|---|---|---|---|---|---|---|---|---|
| Example 1 | Br2ST/DVB (85/15) | 1.66 | 30 | Colorless transparent | 0.05 | 290 | 0.6 | Good |
| Example 2 | PBPEA/DVB (85/15) | 1.65 | 28 | Colorless transparent | 0.02 | 310 | 1.0 | Good |
| Example 3 | PBPHM/DVB (80/20) | 1.64 | 29 | Colorless transparent | 0.02 | 300 | 0.7 | Good |
| Example 4 | Br2ST/PBPEA/DVB (40/40/20) | 1.65 | 30 | Colorless transparent | 0.01 | 310 | 0.9 | Good |
| Example 5 | Br2ST/XDI-AEBr HEBr PP (70/3.6-26.4) | 1.65 | 31 | Colorless transparent | 0.04 | 410 | 0.6 | Good |
| Example 6 | Br2ST/XDI-AEBr HEBr PP/DVB (70/2.4-17.6/10) | 1.65 | 31 | Colorless transparent | 0.05 | 370 | 0.8 | Good |
| Example 7 | Br2ST.PBPEA/HMDI-AEBr HEBr PP/BAEBr PS (45/18/1.1-8.9/27) | 1.65 | 31 | Colorless transparent | 0.05 | 400 | 0.6 | Good |
| Example 8 | Br2ST/PBPEA/HDMA (60/10/30) | 1.60 | 40 | Colorless transparent | 0.03 | 300 | 1.1 | Good |
| Example 9 | Br2ST/PBPEA/EGDMA (45/20/35) | 1.60 | 40 | Colorless transparent | <0.05 | 410 | 1.0 | Good |
| Example 10 | Br2ST/DVB/TBPeA (40/20/40) | 1.61 | 40 | Colorless transparent | 0.01 | 310 | 0.9 | Good |
| Comparative Example 1 | ST/BMEBr2 PP (40/60) | 1.59 | 32 | Colorless transparent | >0.10 | 250 | 2.3 | Good |
| Comparative Example 2 | ST/HMD1-AEBr2HEBr2 PP (40/6-54) | 1.60 | 32 | Colorless transparent | >0.10 | 350 | 1.8 | Good |
| Comparative Example 3 | DBPMA/BMEBr2PS (70/30) | 1.59 | 38 | Colorless transparent | >0.25 | <100 | >2.0 | Poor |

The abbreviations in Table 1 indicate the following compounds.
Br2-ST: Dibromostyrene
DVB: divinylbenzene
PBPEA: 2,3,4,5,6-pentabromophenoxyethyl acrylate
PBPHM: 3-(2,3,4,5,6-pentabromophenoxy)-2-hydroxypropyl methacrylate
XDI: xylylene diisocyanate
AEBr2HEBr2PP: 2-(4-acryloxyethoxy-3,5-dibromophenyl)-2-(4-hydroxyethoxy-3,5-dibromophenyl)propane
BAEBr2PS: 2,2-bis(4-acryloxyethoxy-3,5-dibromophenyl)sulfone
HMDI: hexamethylene diisocyanate
HDMA: 1,6-hexane dimethacrylate
EGDMA: ethylene glycol dimethacrylate
TBPeA: tribromo pentyl acrylate a methyl group or hydrogen, W is one being selected out of groups

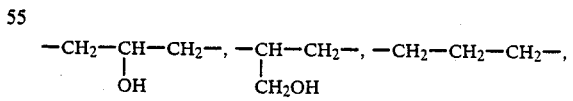

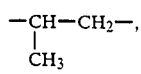

and —CH2—CH2—, and r is an integer of from 1 to 5, and s is an integer of from 1 to 4.

3. A plastic lens according to claim 1, wherein component C is 2,3,4,5,6-pentabromophenoxyethyl acrylate.

4. A plastic lens according to claim 1, wherein the polymer is formed by cast-polymerization.

* * * * *